(12) United States Patent
Huyer

(10) Patent No.: US 6,547,319 B1
(45) Date of Patent: Apr. 15, 2003

(54) DEVICE FOR OPERATING A COVER

(75) Inventor: Johannes Nicolaas Huyer, BJ Zandvoort (NL)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/914,760

(22) PCT Filed: Mar. 3, 2000

(86) PCT No.: PCT/EP00/01891

§ 371 (c)(1), (2), (4) Date: Jan. 16, 2002

(87) PCT Pub. No.: WO00/51835

PCT Pub. Date: Sep. 8, 2000

(30) Foreign Application Priority Data

Mar. 5, 1999 (NL) .................................. 1011473

(51) Int. Cl.[7] .............................................. P60J 7/047
(52) U.S. Cl. .................................. 296/216.03; 296/223
(58) Field of Search ..................... 296/216.02, 216.03, 296/223

(56) References Cited

U.S. PATENT DOCUMENTS 4,469,371 A * 9/1984 Jardin ........................ 296/223
4,696,511 A 9/1987 Laville et al. ............ 296/218 X
5,765,907 A 6/1998 Nabuurs ................. 296/223 X

FOREIGN PATENT DOCUMENTS

EP 0 543 427 5/1993
GB 2164006 * 3/1986 ............ 296/216.03

* cited by examiner

Primary Examiner—Dennis H. Pedder
(74) Attorney, Agent, or Firm—Nixon Peabody LLP; David S. Safran

(57) ABSTRACT

The invention relates to a device for actuating a cover (2) for selectively closing an opening (66) in a surface (3) which surrounds the latter in a first position or for at least partially clearing the opening in a second position, the cover (2) being formed especially by the top in the opening in the roof of a motor vehicle which forms the surface (3), and the device comprising the following means:

a swivelling arm which extends from the front end to the back end and which is provided with means for attachment of the cover (2);

a lifting device (14) to produce a swivelling motion on the swivelling arm relative to the surface (3), and drive to apply force to the lifting device (14) and to move the cover (2) between the first and the second position in that the swivelling arm has at least two elements (A, C) which are connected to one another to be able to move or telescope, the end (30) of one of the elements (A) being hinged via a fulcrum to the stationary part of the device or the surface (3).

8 Claims, 4 Drawing Sheets

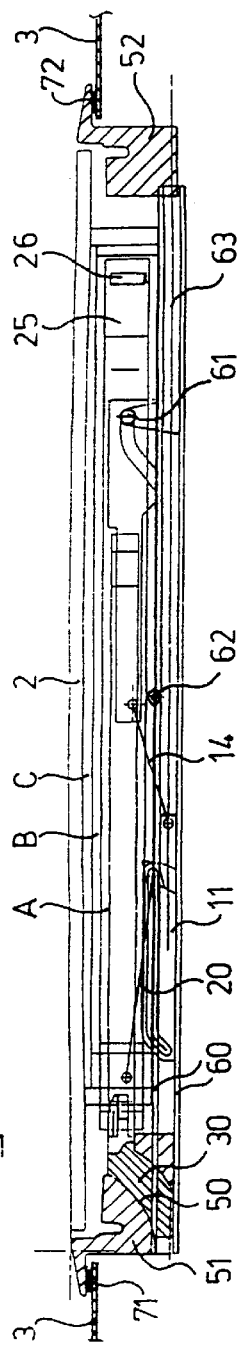
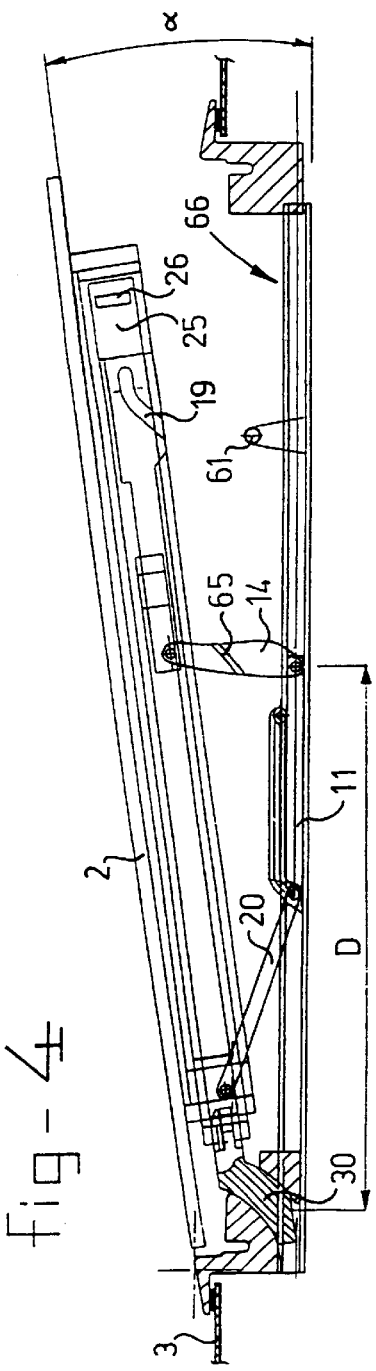
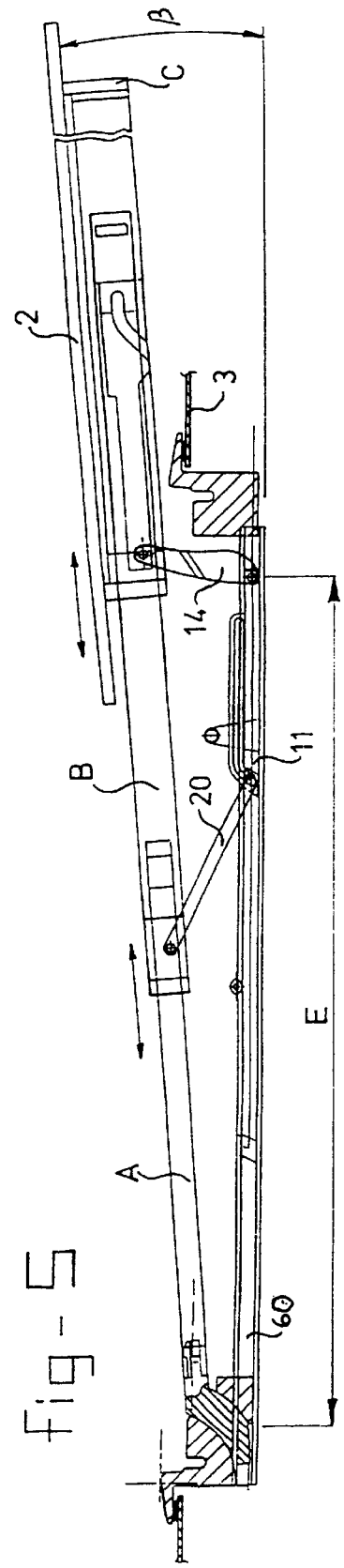

DEVICE FOR OPERATING A COVER

BACKGROUND OF THE INVENTION

1. Field of the Invention

This invention relates to a device for actuating a cover for selectively closing an opening, in a surface which surrounds the cover, in a first position or for at least partially clearing the cover in the opening in a second position, and particularly, the cover forming the top in the opening in the roof of a motor vehicle, which roof forms the surface. The device includes the following elements:

- a swiveling arm which extends from the front end to the back end of the cover and which is provided with means for attachment of the cover;
- lifting means to produce a swiveling motion on the swiveling arm relative to the surface, and
- drive means to apply force to the lifting means and to move the cover between the first and the second position.

The device is especially suited for actuating an adjustable cover in an openable roof of an automobile. The cover is movably attached on the roof of the auto by means of the device.

2. Description of Related Art

A device of the initially mentioned type is known from European patent 0 543 427. In it the cover is attached in a frame which is mounted around the opening in the roof. The cover is attached to two swiveling arms which are mounted on either side of the cover. The cover can be swiveled relative to the frame by means of these arms. The front end of each of the swiveling arms is hinged via a coupling arm to the front part of the drive slide. These slides can be pushed in a rail. On each of these slides moreover, on the respective back end, a lever is mounted which is hinged to the swiveling arm. When the cover is opened the drive slides are pushed in the back direction for example by means of a cable from the front end of the rail. In the first part of this motion, the cover swivels by means of the lever into a tilted position or lift position. In doing so, viewed in the direction of travel of the vehicle, the cover pivots around the front side so that the back side of the cover projects over the roof. A ventilation gap is formed between the back side of the cover and the roof. The roof is extended rearward by continued motion of the drive slides in the back direction. Since the swiveling arms and the levers are connected to the drive slides, these swiveling arms and levers are moved together with the cover mounted thereon overall (in the tilted position) in the back direction of the opening. This sliding motion clears the front part of the opening.

With open roofs of motor vehicles it is one objective for the ratio between the area of the opening in the roof (size of the cover) and the area which can actually be cleared (maximum opened position) to be as favorable as possible. In the case in which the cover can be moved over a relatively great distance, a relatively small opening can suffice to open the desired roof area. In one such favorable ratio between the size of the cover and the area actually to be opened in the device it is presupposed that the distance between the fulcrum of the lever with the drive slide as far as the fulcrum of the front end of the swiveling arm is kept as small as possible. This distance between the fulcrum on the front end of the swiveling arm and the fulcrum of the lever corresponds to the length of the section over which the cover is connected to the supporting guide rail (which is also called the support base of the device). The support base is important especially for the stability of the cover in the opened position. It should be clear that in the opened position the cover is exposed to considerable wind forces especially at higher speeds. To prevent the device from being bent or in some other way adversely affected under the influence of the forces exerted by the wind, the stability of the cover and the device which supports it must be as large as possible.

In the device claimed in the aforementioned European patent ('427) the desire is to clear the opening as far as possible, in contrast to the desire to keep the cover as stable as possible in the opened position.

SUMMARY OF THE INVENTION

The object of the invention is to devise a device in which a cover can be moved from a closed position into an opened position, and such that on the one hand the cover can be moved as far as possible in order to clear the opening as far as possible, while on the other hand providing relatively great stability to the cover during the entire movement of the cover.

This object is achieved in this invention by the swiveling arm having at least two elements which are connected to one another to be able to move or telescope, the front end of one of the elements being hinged via a fulcrum to the stationary part of the device or the surface.

This measure results in that the fulcrum of the swiveling arm is immobile relative to the base, i.e. the surface. This means that the swiveling arm, when the cover is being opened, does not move as a whole jointly with the cover relative to the surface, but that the swiveling arm increases its length when the cover is being pushed on. The lifting means, for example in the form of a lever, can move at the same time with the cover. The stationary fulcrum between the swiveling arm and the surface on the one hand and the fulcrum which is moving at the same time between the surface and the lifting means on the other hand results in that the length of the support base of the device increases while the cover is opening. This is advantageous for stability.

The angular torsion of the cover relative to the base is determined on the one hand by the length of the lifting means and on the other hand by the distance of the lifting means to the stationary fulcrum. In this way the angular torsion of the cover relative to the base will decrease when the cover is extended to the outside. In this way the wind resistance of the cover is increasingly reduced in the direction to its complete opening.

According to one preferred embodiment, it is possible for the swiveling arm to have an intermediate element which is movably connected on the one hand to the first element and which is movably connected on the other hand to a third element. In this embodiment, it is possible for the means for attachment of the cover to be attached to the third element.

This embodiment makes it possible for the cover to be attached to the rear element which is movably attached to the first or the intermediate element of the swiveling arm. It is thus possible for the freedom of motion of the cover to be further increased relative to the stationary fulcrum. The extreme position of the cover relative to the stationary fulcrum is not determined by the distance between the stationary fulcrum and the end of the second element or the distance between the stationary fulcrum and the lever. The cover can be pushed further out of the opening by the additional length which is offered by the third element. This makes it possible to clear the opening in the completely opened state over a relatively large area.

Furthermore, in another object of the invention, it is possible for the elements of the swiveling arm to be made as telescoping elements, the front element being connected to the first end of a flexible compression-tension element which is guided via a guide groove near the back end of the intermediate element to the attachment for the second end of the compression-tension element, which attachment is mounted on the third element.

The action of the compression-tension element results in that the rear element is similarly automatically moved relative to the front element when the intermediate element is moved relative to the front element. Since the compression-tension element extends from the front element via a guide groove in the intermediate element to the attachment on the rear element, when the intermediate element moves relative to the front element the rear element will move relative to the intermediate element, which movement is greater than the motion of the intermediate element relative to the front element. If the compression-tension element does not extend when the respective elements move or does not change its length in some other way, the rear element will move exactly twice as fast as the intermediate element. Thus considerable displacement motion of the cover can be produced by a short actuating path.

According to one advantageous embodiment, it is possible for the device to comprise a guide rail which extends in the lengthwise direction of the opening on its sides from the front end to the back end, the drive means being connected to the lifting means via a drive slide which can be moved in the guide rail between the front and the back end of the rail, and the lifting means being connected by the first end to the drive slide and by the second end to the swiveling arm. Here it is possible for the lifting means by its second end to be connected to the intermediate element and for the lifting means to comprise a lever, the lever being hinged by the first end to the drive slide and hinged by the second end to the intermediate element.

The drive slide and thus the lever coupled to it can be pushed together in the back direction for extending the roof. The maximally extended position is reached when the drive slide reaches the back end of the rail. In this position, the swiveling arm will be maximally extended. The rear element moving relative to the intermediate element yields a very favorable ratio between the surface of the cover and the extended part of the opening. Furthermore, the support base in the maximum position also will have the maximum length and thus a favorable effect on stability.

As set forth below, in the invention it is possible for the system to comprise a coupling arm which is hinged by the first end to the drive slide and by the second end to the intermediate element.

This measure makes it possible from the closed position for the drive slide to move first for a certain path relative to the intermediate element. In this section the drive slide will allow mainly the lever to rotate and thus the cover to swivel relative to the roof.

This invention is suitable especially for actuating the cover of an openable roof for a motor vehicle. But other covers are also possible, for example roof hatches on buildings, can be advantageously actuated with it.

BRIEF DESCRIPTION OF THE DRAWINGS

FIG. 3 illustrates the device for an openable roof of the invention in the closed position;

FIG. 4 illustrates the device for an openable roof of the invention in the open position;

FIG. 5 illustrates the device for an openable roof of the invention in the extended position;

DETAILED DESCRIPTION OF THE INVENTION

Figure 1:
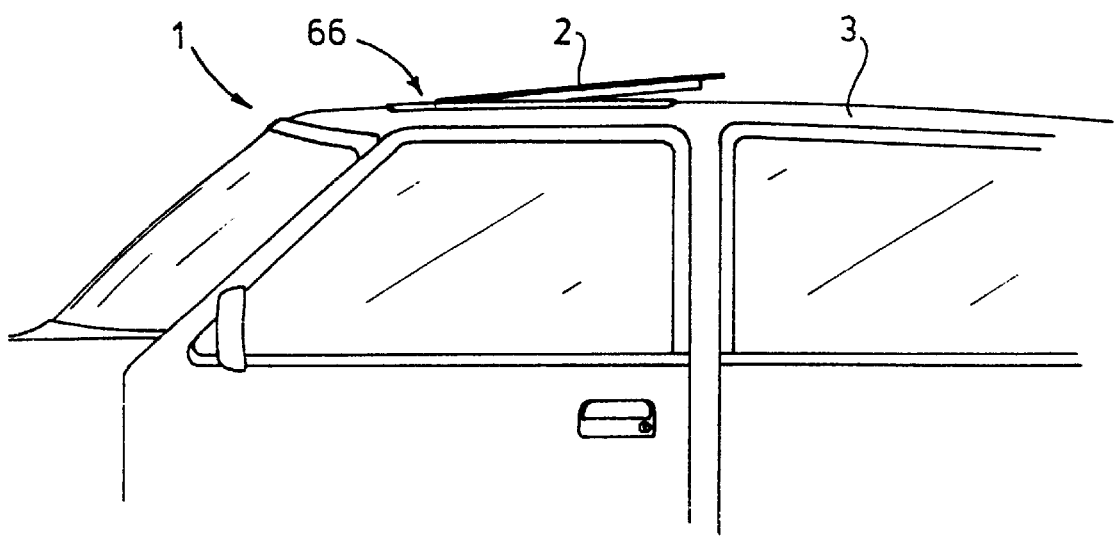
FIG. 1 is a side view of the roof of a motor vehicle in which a cover that can be opened is mounted.

FIG. 1 shows part of a motor vehicle 1, in the roof 3 a top being mounted as a cover 2. The cover 2 is mounted in an opening 66 in the roof 3 which acts as the surrounding surface. The cover 2 can be pushed between a first position in which the cover 2 closes the opening 66, and a second position in which the cover 2 is pushed towards the rear of the motor vehicle so that the opening 66 is at least partially cleared. In FIG. 1, the roof is partially opened, by which the cover 2 projects out of the roof of the motor vehicle 1.

To be able to move the cover 2 out of the first closed position into the second opened position, the cover 2 is normally tilted first around a swiveling axis into a lifted position and afterwards pushed to the back. This means that while the cover in the oblique position it is moved to the rear. The tilted or lifted position is normally used to effectively ventilate the interior, while the wind noise is kept low. It is clear that the cover 2 in the opened position will provide wind resistance. First of all, it is important from an aerodynamic standpoint that the amount of wind to which the cover 2 is exposed be as low as possible. Moreover, it is such that the more resistance the cover experiences, the greater will be the forces acting on the mechanism use to move the cover 2 out of the roof 3. For these described reasons, it is therefore advantageous if the cover 2 remains in the opened position as near as possible to the roof 3 of the motor vehicle. This means that the angular torsion by which the cover is swiveled is kept as small as possible.

Figure 2:
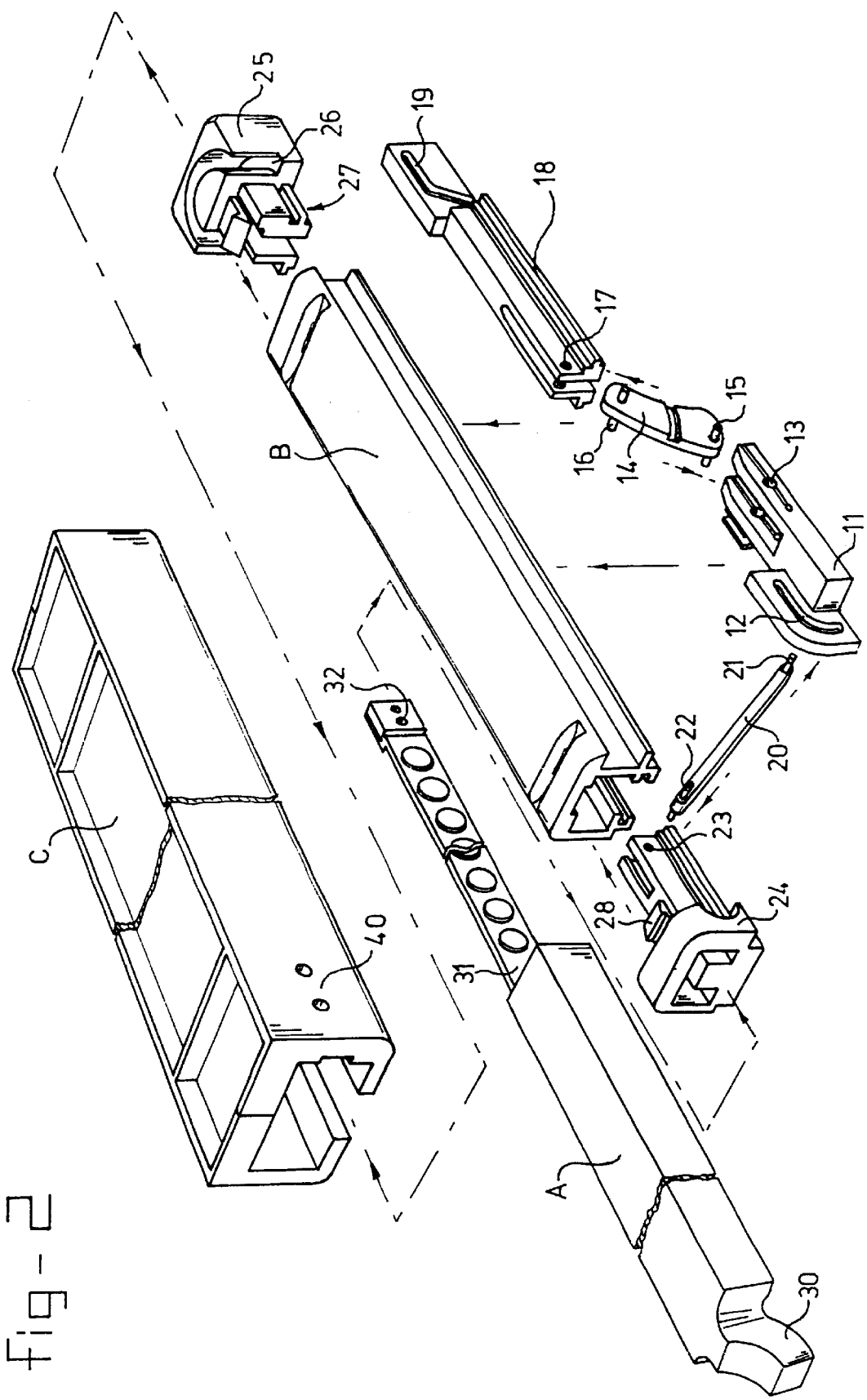
FIG. 2 illustrates the individual parts of one embodiment of the device of the invention.

FIG. 2 shows the parts which are used in the device, i.e. which are used to push the cover 2 to the outside, as illustrated in FIG. 1. On either side of the roof opening 66 one fixed guide rail 60 each is mounted, in which one drive slide 11 at a time is movably guided. This drive slide 11 comprises in its upper part a guide groove 12. Moreover, the drive slide 11 comprises attachment eyes 13 into which a lever 14 can be pivotally inserted.

This lever 14 is on the one hand connected by pins 15 which fit into the attachment eyes 13 of the drive slide 11 and is pivotally connected on the other hand by pins 16 to an attachment part 17 which is located in a slide part 18. The slide part 18 further comprises a curved guide path 19.

Not only is the lever 14 attached to the drive slide 11, but also a coupling arm 20 is attached. This coupling arm 20 is attached by means of first pins 21 to be able to move and turn in the guide groove 12. Furthermore, the coupling arm 20 comprises pins 22 using which it is pivotally connected to a receiving part 23 which is mounted in the first end block 24. This first end block 24 is explained below in detail.

The drive slide 11 together with the lever 14, the slide part 18 and the coupling arm 20 forms the "drive part" of the device of the invention.

The swiveling arm of the device with which the cover 2 is moved out of the vehicle is formed by three telescoping elements A, B and C. On the top of the telescoping element C the cover 2 is attached. For the sake of clarity, FIG. 2 does not show the cover 2. The first telescoping element A on the front end has a hinge part 30. On the other end of the telescoping element A, a flexible compression-tension element 31 is attached. The telescoping element A is connected to the telescoping element C by means of this flexible compression-tension element 31.

The telescoping element A is inserted movably guided into the telescoping element B. This telescoping element B, for its part, is attached movably guided in the telescoping element C. The slide part 18 is also housed and movably guided in the telescoping element B.

The telescoping element B is provided with an end block on both sides. On the front side shown in FIG. 2 a first end block 24 can be recognized which can be attached to the first end of the telescoping element B. The first end block 24 is attached in the element B by attachment means 28 in the form of a movable clamp with a catch projection which fits into a slot. On the opposite end of the telescoping element B a second end block 25 is attached. This second end block 25 is provided with a guide groove 26 in order to guide the flexible compression-tension element 31 in the form of deviation by 180°. Moreover the second end block 25 is provided with attachment means 27 in the form of a movable clamp with a catch projection which fits into a slot, using which projection the second end block 25 is attached in the telescoping element B.

The telescoping elements A, B and C are attached by means of a flexible compression-tension element 31 with a capacity to move relative to one another. This flexible compression-tension element 31 is attached by one end to the back end of the telescoping element A. On its other end the flexible compression-tension element 31 is provided with attachment means 32 for the attachment of the flexible compression-tension element 31 to the telescoping element C. For attachment of the flexible compression-tension element 31, the telescoping element C is provided with attachment means 40. When pushed together, the flexible compression-tension element 31 is guided by the end of the telescoping element A via the guide groove 26 in the second end block 25 in the direction of the attachment means 40 of the telescoping element C. Therefore, the telescoping elements A, B and C are connected to one another, but can be moved relative to one another.

The flexible compression-tension element 31 can be made in different ways. In one embodiment the compression-tension element 31 comprises a thin flexible strip, for example, of stainless steel, that is enclosed between two likewise flexible strips of plastic. For good guidance of the compression-tension element 31, the plastic of the compression-tension element 31 together with the material of the guide groove 26 in the second end block 25 have a relatively low coefficient of friction.

The action of the telescoping elements of the invention is further detailed using FIGS. 3, 4 and 5. In FIGS. 3, 4, and 5 the left side of the drawings is always designated the front or the forward side. The right side in the drawings is the back or the rear side. This information is given due to the function of the sliding roof which can be moved from the front of the vehicle to the back of the vehicle in use.

FIG. 3 shows that the respective telescoping elements A, B, and C are pushed into one another. That is, FIG. 3 shows the situation in which the cover 2 is in the closed state. The telescoping element A is attached with its front part 30 to pivot in a guide groove 50 which is held in the frame 51. FIG. 3 also shows that the cover on the back also adjoins the roof 3 via the frame 52. To prevent confusion due to the large number of lines, in FIG. 3 the coupling arm 20 and the lever 14 areshown by one line. Between the frame 51 and the roof 3, a seal 71 is attached to prevent possible leaks. One such seal 72 is also attached between the frame 52 and the roof 3. Between the cover 2 and the respective frames 51 and 52 seals can also be attached. These seals are not shown in the Figure. It is clear that the seals can consist of any suitable material, for example, rubber.

FIG. 3 furthermore shows that the drive slide 11 is housed with a sliding capacity in the guide rail 60. This guide rail 60 extends in the lengthwise direction of the motor vehicle 1 in which the device is mounted. A first fixed cam 61 and a second fixed cam 62 are connected to this guide rail 60. This means that these cams 61 and 62 cannot be moved relative to the guide rail 60. As is explained below, these cams 61 and 62 are used for swiveling the cover 2 outwardly when the cover 2 is being opened and for swiveling of the cover 2 inwardly when the cover is being closed.

Other drive means 63 are connected to the drive slide 11; using them the drive slide 11 in FIGS. 3 to 5 can be moved to the left or right. These drive means 63 are shown schematically with a line. The drive means 63 can be formed for example by a cable which is driven by a motor (not shown).

FIG. 4 shows the device as claimed in the invention, the cover 2 being tilted at an angle relative to the roof 3 of the motor vehicle. This tilting is initiated first by the displacement of the drive slide 11. The guide slot 19 is moved over the fixed cam 61. The cover 2 is moved somewhat outwardly by the shape of the path of this guide slot 19 over the fixed cam 61. Secondly, the swiveling motion is effected by means of a lever 14. This lever 14 is provided with a slot 65 which interacts with the fixed cam 62. The displacement of the drive slide 11 moves the lever 14 coupled to it via the guide slot over the fixed cam 62. This motion tilts the cover 2 outwardly by the lever 14. The action of the slot 65 which is mounted in the lever 14, together with the guide slot 19 which is mounted in the sliding part 18 can be made for example just like the swiveling device which is known from European patent 0 543 427. Therefore reference is made to that European patent for the detailed action of this swiveling motion.

The fulcrum for the tilting motion of the cover 2 is formed by the projecting part 30 on the telescoping element A. From the position shown in FIG. 4, the telescope mechanism to which the cover 2 is attached is pushed out further by the drive slide 11 being pushed further in the direction of the rear side of the opening 66 in the roof 3. As the drive slide 11 continues to move, the telescoping element B is moved further to the right by the coupling arm 20 (as is shown in the drawings). As the telescoping element B moves to the right, the telescoping element C is moved further to the right.

The extreme open position of the mechanism is shown in FIG. 5. As is apparent, the cover 2 in the position as shown in FIG. 5 forms an angle with the roof 3. This angle β is less than the angle α which is shown in FIG. 4. As can be seen in FIGS. 4 and 5, the telescoping element B is connected to the guide rail 60 on the one hand via the coupling arm 20 and on the other hand via the lever 14. The motion of the telescoping element C is caused by the coupling of the telescoping element C to the telescoping element A via the flexible compression-tension element 31. This attachment is further explained using FIGS. 6 and 7. Since the respective telescoping elements A, B, and C have a common fulcrum, which is formed by the projecting part 30 which is attached to the telescoping element A, the back of the cover 2 will remain relatively near over the roof 3. This is exemplified by a comparison between FIGS. 4 and 5. The angular positions α and β which are shown in FIGS. 4 and 5 and are determined on the one hand by the length of the lever 14 and on the other hand by the distance of the lever 14 to the fulcrum of the projecting part 50 in the frame 51. The farther the lever 14 is moved to the right (in the direction facing away from the fulcrum), the smaller the resulting angle between the cover 2 and the roof 3 will be.

As indicated previously, the object of this invention is to devise a device for attachment of the cover in the opening of the roof of a motor vehicle, in which the cover in the opened position essentially clears the opening, while the stability of the cover in the opened position is relatively high. Moreover, it is advantageous for the cover in the vertical direction to be moved relative to the roof over a relatively short distance. These objects are achieved by the above described manner of sliding the cover 2 to the open position.

This movement to an extended position results in the stability of the cover 2 being kept held relatively high over the entire lifting motion of the cover 2. The support base of the mechanism which is used to push the cover 2 out is formed by the distance between the lever 14 and the fulcrum which is formed by the projecting part 30. The support base which is shown in FIG. 4 has a length D. When the cover 2 is pushed outwardly from the opening 66 the distance of the lever 14 to the fulcrum 30 increases. The support base which is shown in FIG. 5 has a length E. This means that the length of the support base increases as the cover 2 is being pushed outwardly. This therefore means that, in contrast to the previously known mechanism, the stability of the cover 2 is maintained as the cover 2 is being pushed out.

Figure 6:
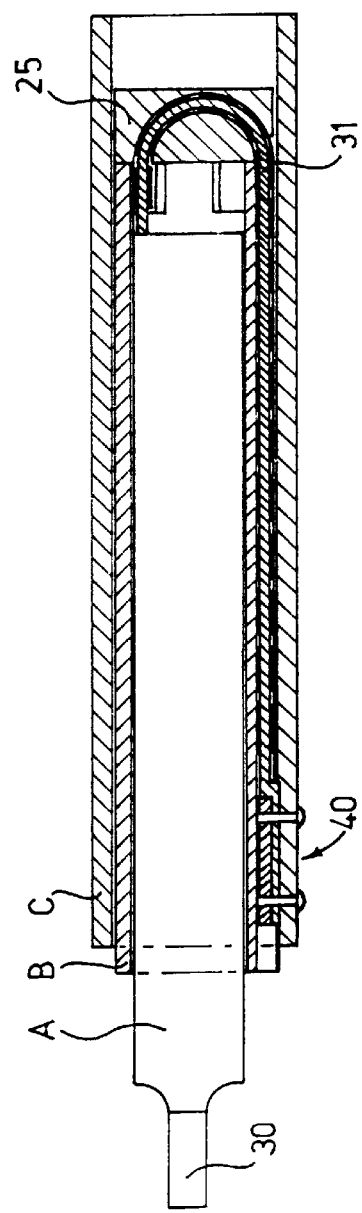
FIG. 6 illustrates in detail the attachment of the telescoping elements of the device of the invention in the closed position.

FIG. 6 shows the attachment of the telescoping elements A, B and C, the individual elements being connected to one another by means of the flexible compression-tension element 31. As stated, the telescoping element A is connected on its back to the compression-tension element 31. This compression-tension element 31 is deflected via a guide 26 which is U-shaped in a plan view in the end block 25 by 180° and is guided in the direction of the attachment means 40 which is mounted in the telescoping element C. The element 30 which forms the front end of the telescoping element A is connected essentially stationary to the base in the direction of motion of the cover 2. This means that while the respective telescoping elements B and C are being pushed out, when the telescoping element B is moved by the drive means in the direction opposite the element 30, the element C is entrained relative to the element A.

Figure 7:
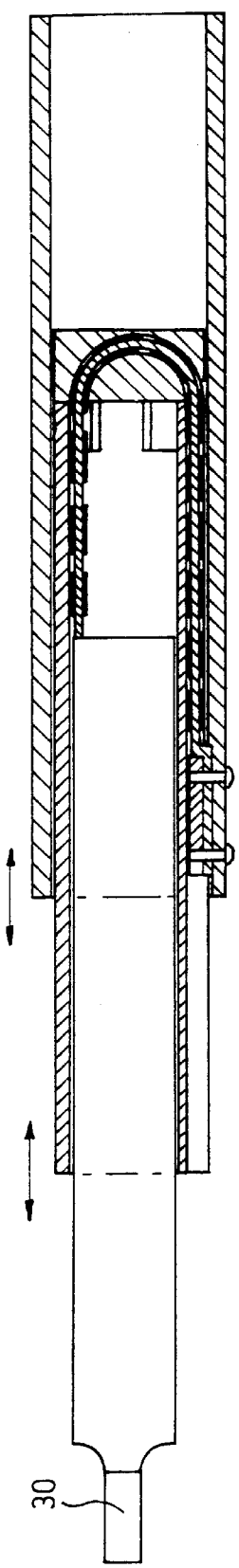
FIG. 7 illustrates the attachment of the three telescoping elements of the device in the at least partially opened position.

FIG. 7 shows the position in which the elements A, B, and C are moved slightly apart from one another. The element C will be moved relative to the element A with twice the speed of element B by the guidance of the flexible compression-tension element 31 via the guide groove 26 in the end block 25.

The case was mentioned above in which the cover 2 is guided to the outside from the closed position by means of the mechanism of this invention. It is clear that by means of the mechanism the cover 2 is returned also into the closed position when the actions are carried out essentially in the sequence of FIGS. 5, 4 and 3.

What is claimed is:

1. Device for actuating a cover for selectively closing, in a first position, an opening in a surface, and in a second position, for at least partially clearing the opening, comprising, a swiveling arm which extends from a front end of the opening to a back end opening and is attached to the cover;

a lifting means to produce a swiveling motion on the swiveling arm relative to the surface, and drive means to apply force to the lifting means so as to move the cover between the first and the second position, wherein, the swiveling arm comprises a first element and a second element connected to one another so as to be able to move relative to each other, such that an end of the first element is hinged to a fulcrum on a stationary part of the surface, and the swiveling arm further comprises an intermediate element which is movably connected at one end thereof to the first element and is movably connected at an opposite end thereof to the second element.

2. Device as set forth in claim 1, wherein the second element of the swiveling arm forms the attachment to the cover.

3. Device as set forth in claim 1, wherein the first, second, and intermediate elements of the swiveling arm are assembled in a telescoping relationship, wherein the first element is connected to a first end of a flexible compression-tension element which is guided by a guide groove near a far end of the intermediate element to an attachment means, located on the third element, for a second end of the compression-tension element.

4. Device as set forth in claim 1, further comprising a guide rail which extends in a lengthwise direction of the opening from a near end to a far end, wherein said drive means is connected to the lifting means through a drive slide movable along the guide rail between the near end and the far end of the guide rail and wherein the lifting means is connected at a first end to the drive slide and at a second end to the swiveling arm.

5. Device as set forth in claim 4, wherein the lifting means is connected at the second end to the intermediate element.

6. Device as set forth in claim 4, wherein the lifting means comprise a lever which is hinged at a first end to the drive slide and which is hinged at a second end to the intermediate element.

7. Device as set forth in claim 4, further comprising a coupling arm which is hinged at a first end to the drive slide and is hinged at a second end to the intermediate element.

8. An openable roof for a motor vehicle comprising a motor vehicle roof having a surface with an opening, a movable cover within the opening, and a device for actuating the cover for selectively closing, in a first position, the opening in the surface, and in a second position, for at least partially clearing the cover from the opening, wherein the device comprises, a swiveling arm which extends from a front end of the opening to a back end opening and is attached to the cover;

a lifting means to produce a swiveling motion on the swiveling arm relative to the surface, and drive means to apply force to the lifting means so as to move the cover between the first and the second position, wherein, the swiveling arm comprises a first element and a second element connected to one another so as to be able to move relative to each other, such that an end of the first element is hinged to a fulcrum on a stationary part of the surface, and the swiveling arm further comprises an intermediate element which is movably connected at one end thereof to the first element and is movably connected at an opposite end thereof to the second element.

* * * * *